Feb. 9, 1937.  A. B. MADDIN  2,070,440
HYDRAULIC BRAKE
Filed April 27, 1936  2 Sheets-Sheet 1

INVENTOR,
Arthur B. Maddin
BY
ATTORNEYS.

Feb. 9, 1937.  A. B. MADDIN  2,070,440
HYDRAULIC BRAKE
Filed April 27, 1936  2 Sheets-Sheet 2

INVENTOR.
Arthur B. Maddin
BY Lancaster, Allwine & Rommel
ATTORNEYS.

Patented Feb. 9, 1937

2,070,440

UNITED STATES PATENT OFFICE 2,070,440

HYDRAULIC BRAKE

Arthur B. Maddin, Tulsa, Okla.

Application April 27, 1936, Serial No. 76,681

4 Claims. (Cl. 188—91)

This invention relates to heavy duty hydraulic brakes.

The principal object of the invention is to provide a hydraulic brake particularly (but not solely) adapted for use with industrial machinery where a brake must be employed which is able to operate under especially heavy loads.

Another object is to provide a brake which requires no adjustment of parts and no replacement of brake linings, brake drums, and the like.

Still another object is to provide a hydraulic brake so constructed that there will be no air pockets formed in the body of the brake during operation thereof.

Yet another object is to provide a particularly compact hydraulic brake, taking up but limited space, and operable in confined quarters.

Other objects and advantages of the invention will be apparent during the course of the following detailed description, taken in connection with the accompanying drawings, forming a part of this specification and in which drawings:—

Figure 1:
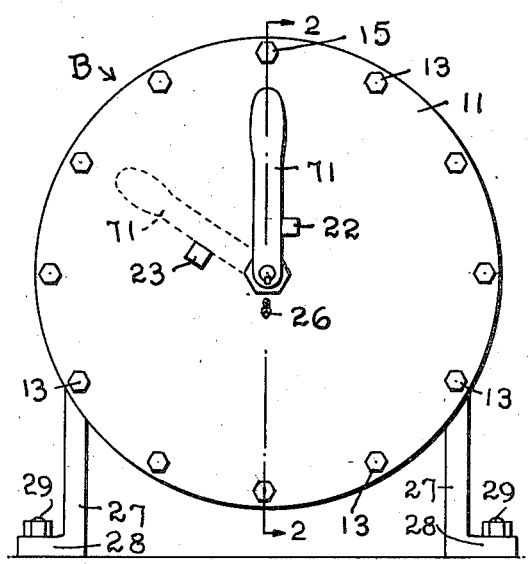
Figure 1 is a front elevation of the novel hydraulic brake.

In the drawings, wherein for the purpose of illustration is shown only a preferred embodiment of the invention and wherein similar reference characters designate corresponding parts throughout the several views, the letter A may designate generally a rotary element with which is associated the novel brake B.

The rotary element A may be a conventional shaft, provided with a keyway 5 and a set screw depression 6 at one end 7. It is this shaft which is employed, as an example, of a rotary member, the rotation of which may be slowed and stopped by the novel hydraulic brake B.

As for the hydraulic brake B, the same includes a housing comprising paralleling end plates 10 and 11 and a cylinder 12 comprising a side wall to which the end plates 10 and 11 are suitably secured as by bolts 13 and nuts 14 and cap screws 15, thus providing a chamber or reservoir 16.

The end plate 10 may be provided with an outwardly extending axially disposed boss 17 which encircles a portion of the rotary element A, and this boss 17 may house and carry suitable conventional packing means 18 as well as anti-friction means 19, such as ball bearings.

The end plate 11 also may be provided with an outwardly extending axially disposed boss 20, carrying and housing suitable packing means 21 disposed about a portion of a second rotary element, to be later described in this specification. Extending outwardly from the outer face of this end plate 11 may be two spaced apart stops 22 and 23, disposed about 60° apart, as shown particularly in Figure 1. Preferably, at the base of the boss 20, the end plate 11 may be tapped so as to provide a screw threaded bore 24 extending towards the axis of the end plate 11 and opening into a central passageway 25 extending from the inner end of the boss 20 to the reservoir 16. This screw threaded bore 24 accommodates a set screw 26, provided for a purpose later described in this specification.

Figure 2:
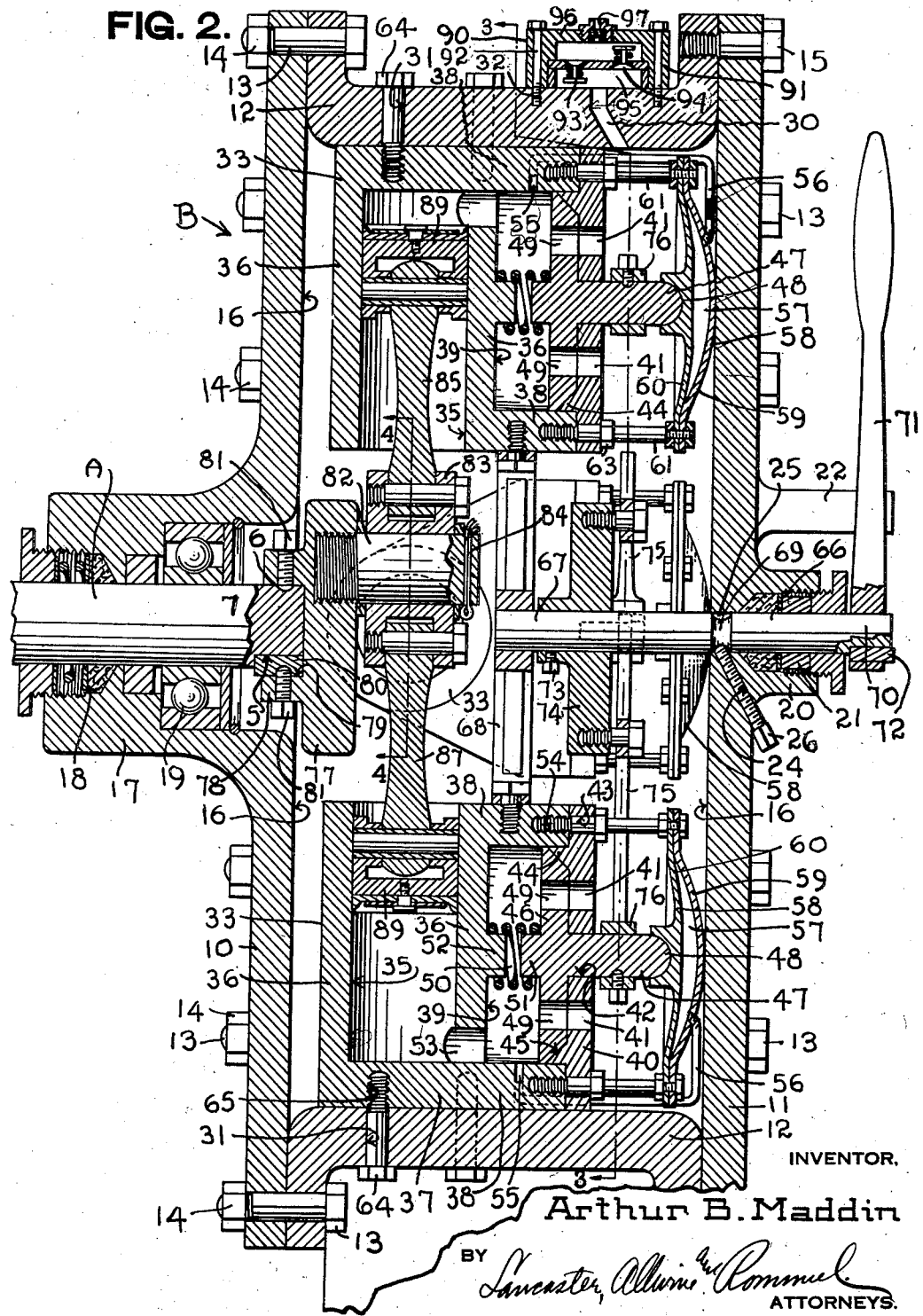
Figure 2 is a vertical section of the same, substantially upon the line 2—2 of Figure 1, the brake being operatively associated with a rotary element, the rotation of which it is adapted to oppose.

As for the cylinder 12, the same may carry legs 27 having feet 28 suitably tapped so that means 29, such as bolts and nuts or cap screws, may be employed to secure the brake structure B to a support, thus rendering the housing substantially stationary. In addition, the wall of the cylinder 12 may be tapped so as to provide a relief passageway 30, shown in Figure 2, leading from the outer periphery of the cylinder 12 to the chamber 13. Since there will be considerable interiorly disposed structure, preferably to be carried by the cylinder 12, the latter may be suitably tapped to provide screw holes 31 to accommodate the shanks of screws which also extend into certain of the structure to be described. Suitable screw sockets 32 may also be provided, extending inwardly from the outer periphery of the cylinder 12, as shown in Figure 2, adjacent the passageway 30.

The structure within the housing includes preferably, four cylinder blocks 33, each having a piston-receiving chamber 35 defined by a substantially cylindrical wall 36 and an end wall 37, the end of each chamber 35, opposite the end wall 37 being open. Extending outwardly from the wall 36 are four walls 38, joined at their ends and, with a portion of the wall 36, defining a compartment 39, closed by a detachable cover member 40 which is preferably provided with a pair of ports 41 which lead from the chamber or reservoir 16 to the compartment 39. The walls 38 merge into the cylindrical wall 36, two opposite walls 38 having the planes of their inner faces substantially normal to the axis of the cylindrical wall 36 and the other two opposite walls 38 first diverging from the cylindrical wall 36 and then extending with the planes of the inner faces thereof substantially paralleling the longitudinal axis of the cylindrical wall 36.

This cover member 40 may be provided with an axial bore 42 and spaced apart screw-accommodating openings 43 disposed preferably adjacent its outer edge. The inner face of the cover member 40 is provided with an extension 44 which fits snugly within the compartment 39 and has a beveled seat 45 inwardly of its edge. Upon this seat is disposed a rotatable valve 46 which may include a stem 47 extending through the bore 42 and protruding from the outer face of the cover member 40, preferably ending in a rounded head 48. This valve 46 is provided with a pair of ports 49 disposed so as to align with the ports 41 upon a partial rotation of the valve 46. An expansion coil spring 50 normally urges the valve 46 against the cover member 40 and this spring 50 is retained in place by a suitable boss 51 upon the valve 46 and boss 52 upon the wall 36.

A port 53 through the wall 36 and disposed close adjacent the end wall 37 forms a communication between the piston receiving chamber 35 and the compartment 39 and when the ports 41 and 49 are open (in alignment) there is communication between the piston receiving chamber 35 and the reservoir or chamber 16 as is apparent. Screw threaded sockets 54 extend into the ends of the walls 38 for a purpose later described in detail.

Extending through one of the walls 38 is a relatively small passageway 55 opening at one end into the compartment 39, the passageway 55 then continuing through the cover member 40 and thence through a suitable tube 56, which opens into the chamber 57 of a pressure equalizer 58 which includes a pair of spaced apart diaphragms 59 and 60 which are, however, secured together at their edges. The diaphragm 60 is in operative contact with the rounded head 48 of the valve stem 47. This pressure equalizer 58 is secured to the cylinder block 33 by suitable means such as bolts 61 and nuts 62, the former extending through some of the bolts accommodating openings 43 in the cover member 40 and into some of the screw threaded sockets 54. Conventional cap screws 63 also aid in connecting the cover member 40 to the four walls 38, these extending through some of the openings 43 and into the sockets 54.

Preferably the four cylinder blocks 33 are arranged in the housing substantially 90° apart so that the axis of each piston receiving chamber 35 is disposed radially of the axis of the housing and, of course, 90° apart. The open end of each chamber 35 faces the axis of the cylindrical wall 12. The blocks 33 may be firmly secured to the wall of the cylinder 12 as by cap screws 64 which extend from exteriorly of the housing, through the holes 31 in the cylindrical wall 12 and thence into screw threaded sockets 65 in the end walls 37 of the cylinder blocks 33.

It may be seen from Figure 2, when the blocks 33 are attached to the cylindrical wall 12, the inner face of the end plate 11 abuts the diaphragm 59 so that the movement of the pressure equalizer will be a positive thrust upon the rounded head 48 of the valve stem 47 when fluid enters the chamber 57 of the pressure equalizer 58. Preferably, a separate pressure equalizer is provided for each valve mentioned.

Figure 3:
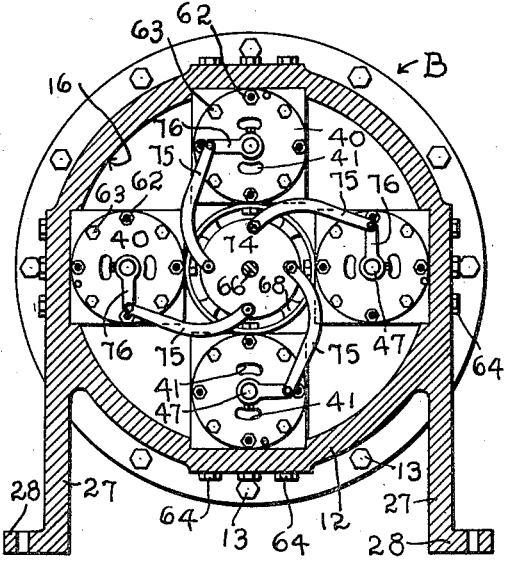
Figure 3 is a section substantially upon the line 3—3 of Figure 1.

Means for operating the valves in unison is provided and includes a second rotary element, preferably a shaft 66, which has its axis of rotation co-axial with the rotary element A. The shaft 66 extends partly into the chamber 16 and its inner end 67 is carried by a spider 68 which is, in turn, in contact with the walls 38 of the cylinder blocks 33, as shown in Figures 2 and 3. Thus the spider 68 acts both as a bearing for the rotary element A and as a brace for the cylinder blocks 33. Where the shaft 66 extends through the passageway 25, the shaft is provided with a circumferential groove 69 into which the end of the set screw 26 projects in order to retain the shaft 66 against longitudinal movement of any consequence. The outer end 70 of the shaft 66 opposite the inner end 67 extends outwardly of the housing and end plate 11 and may terminate in a suitable handle 71 which may be keyed to the shaft 66 as at 72. This handle is, of course, long enough so that as it is moved in an arc it will contact either one of the stops 22 or 23, as shown in full and dotted lines in Figure 1.

Suitably secured to the shaft 66, adjacent its inner end 67, as by a set screw 73 is another rotary member 74 which may be a disc and pivotally connected thereto at one end are preferably four arcuate links 75 which, at their other ends, are pivotally connected to the ends of arms 76 each of which are fixedly secured at their ends to the stems 47 of the valves, so that a turn of substantially 60° will either fully open or fully close the ports 41 and 49.

Now, with reference to the connection between the rotary element A and the brake mechanism, there may be provided a disc member 77 having a collar 78 extending about the inner extremity of the rotary element A, the collar having a slot or keyway 79 so that a suitable key 80 may couple the disc member 77 and rotary element A together when inserted into the keyways 5 and 79. Furthermore, set screws 81 may be employed, as shown in Figure 2, to further secure the rotary element A and disc member 77 together. Extending from the face of the disc member 77 opposite that from which the collar 78 extends, is a crank pin 82, offset as shown in Figure 2. This crank pin 82 carries a bushing 83 secured in place, as by a cotter pin 84, and, coupled to the bushing 83 are preferably four connecting rods comprising a master connecting rod 85 and three ordinary connecting rods 86, 87 and 88. As may be seen in Figure 4, the last three are so pivoted that they may swing in an arc but the master rod 88 is relatively rigid with reference to the bushing 83. Each connecting rod 85 to 88 pivotally carries, at its end opposite its connection with the bushing 83, a suitable piston 89, slidable in the chamber 35.

A relief valve structure 90 is provided including a suitable housing 91 secured, as by cap screws 92 extending through the housing 91 and into the screw threaded sockets 32 of the cylinder 12. This relief valve structure may comprise an outwardly opening valve 93 and an inwardly opening valve 94 carried by a partition bridging the chamber 95 within said housing 91. The structure also includes an upper wall 96 which is provided with a restricted port 97.

Secured together, as shown in Figure 2, a particularly sturdy construction is provided for the hydraulic brake, which will withstand exceedingly heavy hydraulic pressures and permit the use of the brake with heavy machinery. The blocks 33 abut directly the cylindrical wall 12 and are firmly secured in place being additionally braced by the spider 68 which, of course, has another function as has been described.

The valves 46 are prevented from freezing, due to inequalities in pressures since, even with the ports 41 and 49 closed, there will be a by-pass of fluid to the pressure equalizer chambers, through the passageways 55 and tubes 56, and this will cause movement of the diaphragms 58 which will be communicated to the valve stems 47 and cause a very slight separation of the abutting faces of the valves 46 and the cover members 40.

Figure 4:
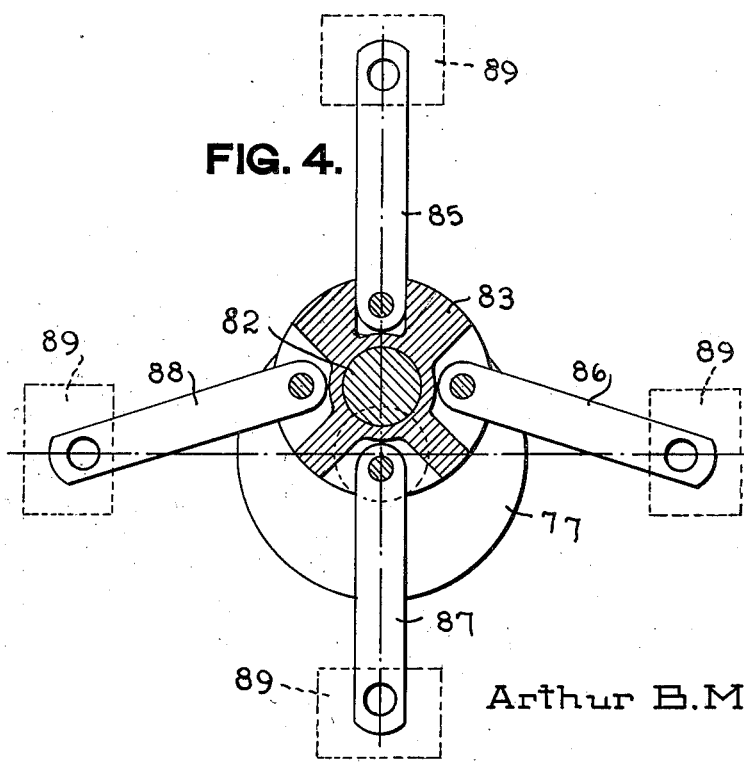
Figure 4 is a section through a portion of the brake structure substantially on the line 4—4 of Figure 2.

With the rotary element A and brake B operatively coupled together as described, the housing filled with suitable fluid, such as oil, and the handle 71 in the full line position shown in Figure 2, the ports 41 and 49 being, therefore open, rotation of the rotary element A will cause the reciprocation of the pistons as is apparent from Figures 2 and 4 and the flow of liquid, forced by two of the pistons out of the chambers 35, through the ports 53 into the compartments 39, through the ports 49 and 41, and into the reservoir 16. While this is occurring, the other two pistons are sucking fluid from the reservoir 16 through the ports 41 and 49, compartments 39 and ports 53 into the chambers 35. However, when the handle 71 is turned substantially 60° to the stop 23, the valves 46 will rotate a partial turn and close the ports 49. Consequently, the flow of fluid will stop and the hydraulic pressure which is immediately built up will cause the rotary element A to cease rotating.

Since the enormous pressure which may be built up would be apt to cause freezing of ordinary valves, the pressure equalizers are provided so that it will be possible to reopen the valves by a turn of the handle 71 substantially 60° against the stop 22 and flow of the fluid will recommence as soon as rotation of the element A is resumed.

This brake is in no sense a dash-pot but a hydraulic brake constructed to withstand particularly high pressures without rupturing, freezing or getting out of order because of weak or delicate interior structure.

By placing the axis of rotation of the handle 71 and rotary element 67 co-axial with that of the rotary element A, an especially compact and efficient arrangement is provided.

Various changes may be made to the form of invention herein shown and described, without departing from the spirit of the invention or the scope of the claims.

What is claimed is:

1. In a heavy duty hydraulic brake for opposing the rotation of a rotary element, a substantially stationary housing including end walls and a cylindrical wall defining a reservoir and also having a plurality of spaced apart radially disposed cylinder blocks, each containing a piston chamber having communication with said reservoir, including a port, said blocks having a wall in abutment with said cylindrical wall and secured thereto, means bracing said cylinder blocks, including a spider having arms secured to said blocks and extending from a central opening in said spider, pistons slidable within said chambers and provided with rods, means within said reservoir operatively connecting said rods with said rotary element, a separate valve for each of said ports, and operating means for operating each valve in unison with the other, including a second rotary element disposed co-axial with said first named rotary element, extending at one end exteriorly of said housing and extending at the other end into said housing and into the central opening in said spider.

2. In a heavy duty hydraulic brake for opposing the rotation of a rotary element, a substantially stationary housing including end walls and a cylindrical wall defining a reservoir and also having a plurality of spaced apart radially disposed cylinder blocks, each containing a piston chamber having communication with said reservoir, including a port, said blocks having a wall in abutment with said cylindrical wall and secured thereto, means bracing said cylinder blocks including a spider having arms secured to said blocks and extending from a central opening in said spider, pistons slidable within said chambers and provided with rods, means within said reservoir operatively connecting said rods with said rotary element, a separate valve for each of said ports, and operating means for operating each valve in unison with the others, including a second rotary element disposed co-axial with said first named rotary element and extending at one end exteriorly of said housing and extending at its other end into said reservoir and into said central opening in said spider, a disc fixed upon said second named rotary element, links pivoted at one end to said disc, arms fixed to said valves at one end and pivoted to said links at their other end, and a handle fixed to the outwardly extending end of said second named rotary element.

3. In a hydraulic brake for opposing the rotation of a rotary element, a stationary housing including end walls and a cylindrical wall defining a reservoir, said housing enclosing a piston chamber having communication with said reservoir, including a port at one end of said chamber, a piston within said chamber and provided with a rod, means within said reservoir operatively connecting said rod with said rotary element, a valve for said port including a rotary valve disc and a stem extending therefrom, a pressure regulator within said reservoir including a pair of diaphragms defining a chamber therebetween, one diaphragm in contact with one of said end walls and the other diaphragm in contact with said valve stem, a conduit providing communication between said first named chamber and said second named chamber, and means for operating said valve from exteriorly of said housing.

4. In a heavy duty hydraulic brake for opposing the rotation of a rotary element, a substantially stationary housing including end walls and a cylindrical wall defining a reservoir and also having a plurality of spaced apart radially disposed cylinder blocks, each block containing a piston chamber having communication with said reservoir, including a port, said block having a wall in abutment with said cylindrical wall and secured thereto, means bracing said cylinder block, including a member having portions secured to said block, said member being provided with a central opening, pistons slidable within said chambers and provided with rods, means within said reservoir operatively connecting said rods to said rotary element, a separate valve for each of said ports, and operating means for operating each valve in unison with the other, including a second rotary element disposed co-axial with said first named rotary element, extending at one end exteriorly of said housing and extending at the other end into said housing and into the central opening in said member.

ARTHUR B. MADDIN.